US012211633B2

(12) United States Patent
Murakawa et al.

(10) Patent No.: US 12,211,633 B2
(45) Date of Patent: Jan. 28, 2025

(54) NON-ORIENTED ELECTRICAL STEEL SHEET

(71) Applicant: NIPPON STEEL CORPORATION, Tokyo (JP)

(72) Inventors: Tesshu Murakawa, Tokyo (JP); Miho Tomita, Tokyo (JP); Hiroshi Fujimura, Tokyo (JP); Satoshi Kano, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 142 days.

(21) Appl. No.: 17/769,272

(22) PCT Filed: Nov. 13, 2020

(86) PCT No.: PCT/JP2020/042428
§ 371 (c)(1),
(2) Date: Apr. 14, 2022

(87) PCT Pub. No.: WO2021/095846
PCT Pub. Date: May 20, 2021

(65) Prior Publication Data
US 2024/0047105 A1 Feb. 8, 2024

(30) Foreign Application Priority Data

Nov. 15, 2019 (JP) .................. 2019-206709
Nov. 15, 2019 (JP) .................. 2019-206813

(51) Int. Cl.
| | | |
|---|---|---|
| *H01F 1/147* | (2006.01) | |
| *C21D 1/30* | (2006.01) | |
| *C21D 6/00* | (2006.01) | |
| *C21D 8/12* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/10* | (2006.01) | |
| *C22C 38/16* | (2006.01) | |
| *C22C 38/60* | (2006.01) | |

(52) U.S. Cl.
CPC .......... *H01F 1/14775* (2013.01); *C21D 1/30* (2013.01); *C21D 6/005* (2013.01); *C21D 6/007* (2013.01); *C21D 6/008* (2013.01); *C21D 8/1222* (2013.01); *C21D 8/1233* (2013.01); *C21D 8/1261* (2013.01); *C21D 8/1277* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/10* (2013.01); *C22C 38/16* (2013.01); *C22C 38/60* (2013.01); *C22C 2202/02* (2013.01)

(58) Field of Classification Search
CPC .... H01F 1/14775; H01F 1/16; H01F 1/14708; H01F 1/14791; H01F 1/147; C21D 1/30; C21D 6/005; C21D 6/007; C21D 6/008; C21D 8/1222; C21D 8/1233; C21D 8/1261; C21D 8/1277; C21D 9/46; C21D 1/26; C21D 8/1205; C21D 8/1266; C21D 8/1272; C22C 38/001; C22C 38/002; C22C 38/004; C22C 38/02; C22C 38/04; C22C 38/06; C22C 38/08; C22C 38/10; C22C 38/16; C22C 38/60; C22C 2202/02; C22C 38/005; C22C 38/008; C22C 38/105; Y02P 10/20

See application file for complete search history.

(56) References Cited

U.S. PATENT DOCUMENTS

| | | | |
|---|---|---|---|
| 2013/0263981 A1 | 10/2013 | Zaizen et al. | |
| 2014/0238558 A1* | 8/2014 | Fujikura | ................ C22C 38/06 148/307 |
| 2018/0030558 A1 | 2/2018 | Okubo et al. | |
| 2018/0202021 A1 | 7/2018 | Oda et al. | |

FOREIGN PATENT DOCUMENTS

| | | |
|---|---|---|
| EP | 3 214 195 A1 | 9/2017 |
| JP | 2001-303213 A | 10/2001 |
| JP | 2006-199999 A | 8/2006 |
| JP | 4029430 B2 | 1/2008 |
| JP | 4790537 B2 | 10/2011 |
| JP | 2017-137537 A | 8/2017 |
| JP | 2017-193731 A | 10/2017 |
| JP | 6319465 B2 | 5/2018 |
| JP | 2019-178380 A | 10/2019 |
| WO | WO 2012/086534 A1 | 6/2012 |
| WO | WO 2015/170271 A1 | 11/2015 |

* cited by examiner

*Primary Examiner* — Adil A. Siddiqui
(74) *Attorney, Agent, or Firm* — Birch, Stewart, Kolasch & Birch, LLP

(57) ABSTRACT

What is provided is a non-oriented electrical steel sheet having a chemical composition in which, by mass %, C: 0.010% or less, Si: 1.50% to 4.00%, sol. Al: 0.0001% to 1.0%, S: 0.010% or less, N: 0.010% or less and one or a plurality of elements selected from the group consisting of Mn, Ni, Co, Pt, Pb, Cu and Au: 2.50% to 5.00% in total with a remainder including Fe and impurities, in which a recrystallization rate is 1% to 99% in a metallographic structure, a sheet thickness is 0.50 mm or less, and, in the case of measuring a magnetic flux density B50 after annealing the non-oriented electrical steel sheet at 800° C. for two hours, a magnetic flux density B50 in a 45° direction with respect to a rolling direction is 1.75 T or more.

20 Claims, No Drawings

NON-ORIENTED ELECTRICAL STEEL SHEET

TECHNICAL FIELD

The present invention relates to a non-oriented electrical steel sheet.

Priority is claimed on Japanese Patent Application No. 2019-206709, filed Nov. 15, 2019, and Japanese Patent Application No. 2019-206813, filed Nov. 15, 2019, the contents of which are incorporated herein by reference.

BACKGROUND ART

Non-oriented electrical steel sheets are used for, for example, cores of motors, and non-oriented electrical steel sheets are required to be excellent in terms of magnetic characteristics, for example, a low iron loss and a high magnetic flux density, on an average in all directions parallel to a sheet surface thereof (hereinafter, referred to as "the whole circumference average (all-direction average) in the sheet surface" in some cases). A variety of techniques have been thus far proposed, but it is difficult to obtain sufficient magnetic characteristics in all directions in the sheet surface. For example, there are cases where, even when sufficient magnetic characteristics can be obtained in a specific direction in the sheet surface, sufficient magnetic characteristics cannot be obtained in other directions.

For example, Patent Document 3 discloses a technique of developing {100} crystal grains using phase transformation for the purpose of improvement in magnetic characteristics. However, in this method, there is a need to increase the sheet thickness after hot rolling to approximately 4 mm as described in examples of Patent Document 3. This thickness creates problems of a difficulty in winding the hot-rolled steel sheet after hot rolling and a difficulty in winding in a pickling step or line operations.

CITATION LIST

Patent Document

[Patent Document 1]
  Japanese Patent No. 4029430
[Patent Document 2]
  Japanese Patent No. 6319465
[Patent Document 3]
  Japanese Unexamined Patent Application, First Publication No. 2017-193731

SUMMARY OF THE INVENTION

Problems to be Solved by the Invention

The present invention has been made in consideration of the above-described problem, and an objective of the present invention is to provide a non-oriented electrical steel sheet in which excellent magnetic characteristics can be obtained on a whole circumference average (all-direction average).

Means for Solving the Problem (1) A non-oriented electrical steel sheet according to an aspect of the present invention has a chemical composition in which,
  by mass %,
  C: 0.010% or less,
  Si: 1.50% to 4.00%,
  sol. Al: 0.0001% to 1.0%,
  S: 0.010% or less,
  N: 0.010% or less,
  one or a plurality of elements selected from the group consisting of Mn, Ni, Co, Pt, Pb, Cu and Au: 2.50% to 5.00% in total,
  Sn: 0.000% to 0.400%,
  Sb: 0.000% to 0.400%,
  P: 0.000% to 0.400%, and
  one or a plurality of elements selected from the group consisting of Mg, Ca, Sr, Ba, Ce, La, Nd, Pr, Zn and Cd: 0.0000% to 0.0100% in total are contained,
  when the Mn content (mass %) is indicated by [Mn], the Ni content (mass %) is indicated by [Ni], the Co content (mass %) is indicated by [Co], the Pt content (mass %) is indicated by [Pt], the Pb content (mass %) is indicated by [Pb], the Cu content (mass %) is indicated by [Cu], the Au content (mass %) is indicated by [Au], the Si content (mass %) is indicated by [Si], and the sol. Al content (mass %) is indicated by [sol. Al], Formula (1) below is satisfied, and
  a remainder includes Fe and impurities,
  in which a recrystallization rate is 1% to 99% in a metallographic structure, a sheet thickness is 0.50 mm or less, and,
  in the case of measuring a magnetic flux density B50 after annealing the non-oriented electrical steel sheet at 800° C. for two hours, a magnetic flux density B50 in a 45° direction with respect to a rolling direction is 1.75 T or more.

$$([Mn]+[Ni]+[Co]+[Pt]+[Pb]+[Cu]+[Au])-([Si]+[sol. Al])>0\% \quad (1)$$

(2) In the non-oriented electrical steel sheet according to (1),
  when a value of a magnetic flux density B50 in a rolling direction is indicated by B50L, a value of a magnetic flux density B50 in a direction at an angle of 45° from the rolling direction is indicated by B50D1, a value of a magnetic flux density B50 in a direction at an angle of 90° from the rolling direction is indicated by B50C, and a value of a magnetic flux density B50 in a direction at an angle of 135° from the rolling direction is indicated by B50D2, after the non-oriented electrical steel sheet is annealed at 800° C. for two hours, Formula (2) below may be satisfied.

$$(B50D1+B50D2)/2>(B50L+B50C)/2 \quad (2)$$

(3) In the non-oriented electrical steel sheet according to (2),
  Formula (3) below may be satisfied.

$$(B50D1+B50D2)/2>1.1\times(B50L+B50C)/2 \quad (3)$$

(4) The non-oriented electrical steel sheet according to any one of (1) to (3) may further contain,
  by mass %, one or a plurality of elements selected from the group consisting of
  Sn: 0.020% to 0.400%,
  Sb: 0.020% to 0.400%, and
  P: 0.020% to 0.400%.

(5) The non-oriented electrical steel sheet according to any one of (1) to (4) may further contain,
  by mass %, one or a plurality of elements selected from the group consisting of Mg, Ca, Sr, Ba, Ce, La, Nd, Pr, Zn and Cd: 0.0005% to 0.0100% in total.

(6) In the non-oriented electrical steel sheet according to any one of (1) to (5),
  in the metallographic structure, the recrystallization rate may be 50% to 99%.
(7) In the non-oriented electrical steel sheet according to any one of (1) to (6),
  in the metallographic structure, the recrystallization rate may be 80% to 99%.

Effects of the Invention

According to the present invention, it is possible to provide a non-oriented electrical steel sheet in which excellent magnetic characteristics can be obtained on a whole circumference average (all-direction average).

EMBODIMENT(S) FOR IMPLEMENTING THE INVENTION

The present inventors carried out intensive studies to solve the above-described problems. As a result, it has been clarified that it is important to make the chemical composition, the thickness and the recrystallization rate appropriate. It also has been clarified that, in the manufacturing of such a non-oriented electrical steel sheet, it is important that a chemical composition of an α-γ transformation is presupposed, the crystal structure is refined by transformation from austenite to ferrite during hot rolling, furthermore, cold rolling is carried out in a predetermined rolling reduction, and the temperature of intermediate annealing is controlled to be within a predetermined range to cause overhanging recrystallization (hereinafter, bulging), thereby facilitating the development of {100} crystal grains, which are, normally, difficult to develop.

As a result of repeating additional intensive studies based on such findings, the present inventors obtained an idea of the present invention.

Hereinafter, an embodiment of the present invention will be described in detail. In the present specification, numerical ranges expressed using "to" include numerical values before and after "to" as the lower limit value and the upper limit value. In addition, it is evident that individual elements of the following embodiment can be combined together.

First, the chemical composition of a steel material that is used in a non-oriented electrical steel sheet according to the embodiment of the present invention and a manufacturing method therefor will be described. In the following description, "%" that is the unit of the amount of each element that is contained in the non-oriented electrical steel sheet or the steel material means "mass %" unless particularly otherwise described. In addition, the chemical composition of the non-oriented electrical steel sheet is indicated by amounts in a case where the amount of the base material excluding a coating or the like is set to 100%.

The non-oriented electrical steel sheet and the steel material according to the present embodiment have a chemical composition in which ferrite-austenite transformation (hereinafter, α-γ transformation) can occur, C: 0.010% or less, Si: 1.50% to 4.00%, sol. Al: 0.0001% to 1.0%, S: 0.010% or less, N: 0.010% or less, one or a plurality of elements selected from the group consisting of Mn, Ni, Co, Pt, Pb, Cu and Au: 2.50% to 5.00% in total, Sn: 0.000% to 0.400%, Sb: 0.000% to 0.400%, P: 0.000% to 0.400% and one or a plurality of elements selected from the group consisting of Mg, Ca, Sr, Ba, Ce, La, Nd, Pr, Zn and Cd: 0.0000% to 0.0100% in total are contained, and the remainder includes Fe and impurities.

In the non-oriented electrical steel sheet and the steel material according to the present embodiment, furthermore, the amounts of Mn, Ni, Co, Pt, Pb, Cu, Au, Si and sol. Al satisfy predetermined conditions to be described below. Examples of the impurities include impurities that are contained in a raw material such as ore or a scrap or impurities that are contained during manufacturing steps.
(C: 0.010% or Less)
C increases the iron loss or causes magnetic aging. Therefore, the C content is preferably as small as possible. Such a phenomenon becomes significant when the C content exceeds 0.010%. Therefore, the C content is set to 0.010% or less. A reduction in the C content also contributes to uniform improvement in the magnetic characteristics in all directions in the sheet surface. The lower limit of the C content is not particularly limited, but is preferably set to 0.0005% or more based on the cost of a decarburization treatment at the time of refining.
(Si: 1.50% to 4.00%)
Si increases the electric resistance to decrease the eddy-current loss to reduce the iron loss or increases the yield ratio to improve punching workability into cores. When the Si content is less than 1.50%, these actions and effects cannot be sufficiently obtained. Therefore, the Si content is set to 1.50% or more. On the other hand, when the Si content is more than 4.00%, the magnetic flux density decreases, the punching workability deteriorates due to an excessive increase in hardness, or cold rolling becomes difficult. Therefore, the Si content is set to 4.00% or less.
(Sol. Al: 0.0001% to 1.0%)
sol. Al increases the electric resistance to decrease the eddy-current loss to reduce the iron loss. sol. Al also contributes to improvement in the relative magnitude of a magnetic flux density B50 with respect to the saturated magnetic flux density. When the sol. Al content is less than 0.0001%, these action effects cannot be sufficiently obtained. In addition, Al also has a desulfurization-accelerating effect in steelmaking. Therefore, the sol. Al content is set to 0.0001% or more. On the other hand, when the sol. Al content is more than 1.0%, the magnetic flux density decreases or the yield ratio is decreased to degrade the punching workability. Therefore, the sol. Al content is set to 1.0% or less.

Here, the magnetic flux density B50 refers to a magnetic flux density in a magnetic field of 5000 A/m.
(S: 0.010% or Less)
S is not an essential element and is contained in steel, for example, as an impurity. S causes the precipitation of fine MnS and thereby impairs recrystallization and the growth of crystal grains in annealing. Therefore, the S content is preferably as small as possible. An increase in the iron loss and a decrease in the magnetic flux density resulting from such impairing of recrystallization and crystal grain growth become significant when the S content is more than 0.010%. Therefore, the S content is set to 0.010% or less. The lower limit of the S content is not particularly limited, but is preferably set to 0.0003% or more based on the cost of a desulfurization treatment at the time of refining.
(N: 0.010% or Less)
Similar to C, N degrades the magnetic characteristics, and thus the N content is preferably as small as possible. Therefore, the N content is set to 0.010% or less. The lower limit of the N content is not particularly limited, but is preferably set to 0.0010% or more based on the cost of a denitrification treatment at the time of refining.

(One or a Plurality of Elements Selected from the Group Consisting of Mn, Ni, Co, Pt, Pb, Cu and Au: 2.50% to 5.00% in Total)

Since Mn, Ni, Co, Pt, Pb, Cu and Au are necessary elements to cause α-γ transformation, at least one or a plurality of these elements needs to be contained in total of 2.50% or more. In addition, regarding the amount of these elements, from the viewpoint of increasing the electric resistance to decrease the iron loss, the total of at least one or a plurality of these elements is more preferably set to more than 2.50%. On the other hand, when the amount of these elements exceeds 5.00% in total, there is a case where the cost increases and the magnetic flux density decreases. Therefore, the total of at least one of these elements is set to 5.00% or less.

In addition, the non-oriented electrical steel sheet and the steel material according to the present embodiment are made to further satisfy the following conditions as conditions for enabling the occurrence of α-γ transformation. That is, when the Mn content (mass %) is indicated by [Mn], the Ni content (mass %) is indicated by [Ni], the Co content (mass %) is indicated by [Co], the Pt content (mass %) is indicated by [Pt], the Pb content (mass %) is indicated by [Pb], the Cu content (mass %) is indicated by [Cu], the Au content (mass %) is indicated by [Au], the Si content (mass %) is indicated by [Si], and the sol. Al content (mass %) is indicated by [sol. Al], the contents are made to satisfy Formula (1) below, by mass %.

$$([Mn]+[Ni]+[Co]+[Pt]+[Pb]+[Cu]+[Au])-([Si]+[sol.Al])>0\% \quad (1)$$

In a case where Formula (1) is not satisfied, since α-γ transformation does not occur, the magnetic flux density decreases.

(Sn: 0.000% to 0.400%, Sb: 0.000% to 0.400% and P: 0.000% to 0.400%)

Sn or Sb improves the texture after cold rolling or recrystallization to improve the magnetic flux density. Therefore, these elements may be contained as necessary; however, when excessively contained, steel becomes brittle. Therefore, the Sn content and the Sb content are both set to 0.400% or less. In addition, P may be contained to ensure the hardness of the steel sheet after recrystallization; however, when excessively contained, the embrittlement of steel is caused. Therefore, the P content is set to 0.400% or less.

In the case of imparting an additional effect on the magnetic characteristics or the like, one or a plurality of elements selected from the group consisting of 0.020% to 0.400% of Sn, 0.020% to 0.400% of Sb and 0.020% to 0.400% of P are preferably contained.

(One or a Plurality of Elements Selected from the Group Consisting of Mg, Ca, Sr, Ba, Ce, La, Nd, Pr, Zn and Cd: 0.0000% to 0.0100% in Total)

Mg, Ca, Sr, Ba, Ce, La, Nd, Pr, Zn and Cd react with S in molten steel during the casting of the molten steel to generate the precipitate of a sulfide, an oxysulfide or both. Hereinafter, Mg, Ca, Sr, Ba, Ce, La, Nd, Pr, Zn and Cd will be collectively referred to as "coarse precipitate forming element" in some cases. The grain diameters in the precipitate of the coarse precipitate forming element are approximately 1 μm to 2 μm, which is significantly larger than the grain diameters (approximately 100 nm) of the fine precipitates of MnS, TiN, AlN or the like. Therefore, these fine precipitates adhere to the precipitate of the coarse precipitate forming element and are less likely to impair recrystallization and the growth of crystal grains in annealing such as intermediate annealing. In order to sufficiently obtain this actions and effect, the total of the coarse precipitate forming element is preferably 0.0005% or more. However, when the total of these elements exceeds 0.0100%, the total amount of the sulfide, the oxysulfide or both becomes excessive, and recrystallization and the growth of crystal grains in annealing such as intermediate annealing are impaired. Therefore, the amount of the coarse precipitate forming element is set to 0.0100% or less in total.

Next, the metallographic structure of the non-oriented electrical steel sheet according to the present embodiment will be described. The details of a manufacturing method will be described below, but the non-oriented electrical steel sheet according to the present embodiment has a chemical composition in which α-γ transformation can occur, and, when cooled after the completion of hot rolling, the non-oriented electrical steel sheet transforms from austenite to ferrite, and the crystal structure is refined. Furthermore, the non-oriented electrical steel sheet of the present embodiment has a metallographic structure in which the recrystallization rate is 1% to 99%. When some of crystals remain non-recrystallized as described above, the magnetic flux density B50 further improves. The reason for controlling the metallographic structure as described above is to decrease the presence ratio of recrystallized crystal grains having crystal orientations other than a {100} crystal orientation that is needed to be developed from the viewpoint of the magnetic characteristics.

When the recrystallization rate is less than 1% or the recrystallization rate is more than 99%, a magnetic flux density-improving effect cannot be obtained. A preferable recrystallization rate is 55% to 95%, and a more preferable recrystallization rate is 80% to 90%.

The recrystallization rate of the non-oriented electrical steel sheet can be specified in the following order. First, a sample collected from the non-oriented electrical steel sheet is polished such that the sheet thickness becomes ½, and the polished surface is observed by the electron backscattering diffraction (EBSD) method. In addition, grains that satisfy any one of the conditions (a) and (b) below are determined as non-recrystallized grains, and the non-recrystallization rate is calculated by dividing the area of non-recrystallized portions by the area of all of the observed visual fields.

(a) The average grain diameter of crystal grains is more than 300 μm.
(b) The aspect ratio of a crystal grain satisfies (length in rolling direction)/(length in 90-degree direction with respect to rolling direction)>2. As the observed visual field, a range of 8 mm² or more is observed.

Next, the thickness of the non-oriented electrical steel sheet according to the present embodiment will be described. The thickness of the non-oriented electrical steel sheet according to the present embodiment is 0.50 mm or less. When the thickness exceeds 0.50 mm, it is not possible to obtain an excellent high-frequency iron loss. Therefore, the thickness is set to 0.50 mm or less. In addition, from the viewpoint of facilitating the manufacturing, the thickness of the non-oriented electrical steel sheet according to the present embodiment is more preferably 0.10 mm or more.

In addition, the non-oriented electrical steel sheet according to the present embodiment may be made to have a distribution of distortions such that a high magnetic flux density can be obtained in all directions more wholly. For example, at the time of observing an arbitrary cross section, when the area ratio of {100} orientation grains is indicated by Sac, the area ratio of {110} orientation grains is indicated by Sag, the area ratio of {100} orientation grains in a region of up to 20% from a side where the kernel average misorientation (KAM) value is high is indicated by Sbc, and the area ratio of {110} orientation grains in the same region is indicated by Sbg, Sac>Sbc>Sag>Sbg is more preferably satisfied. A {100} crystal grain (or {110} crystal grain) refers to a crystal grain that is defined within a tolerance of 100 or less from a target crystal orientation. The {100} crystal grain (or {110} crystal grain or the like) and {100} orientation grain (or {110} orientation grain or the like) have the same meaning.

Here, in order to obtain the above-described relationships, the area ratio of crystal grains on the polished surface of the material that has been polished such that the sheet thickness of the steel sheet becomes ½ can be obtained by, for example, the EBSD method. In addition, the KAM value can be obtained by calculating an inverse pole figure (IPF) from the observed visual fields of EBSD.

The KAM value indicates an orientation difference between measurement points adjacent to each other in the same grain at a certain measurement point. In a place where there are a large number of distortions, the KAM value increases. Only a highly distorted region can be extracted by taking out the region of up to 20% from the side where such a KAM value is high. The measurement point is a region composed of an arbitrary pixel. The region of up to 20% from the side where KAM is high means a region that occupies 20% frequencies from the side where KAM is high in a graph obtained by converting a frequency diagram of the KAM value into a cumulative frequency diagram.

The relationship Sac>Sag in the above-described inequality indicates that the proportion of the {100} orientation grains in the entirety is larger than the proportion of the {110} orientation grains. In annealing after a skin pass, both the {100} orientation grains and the {110} orientation grains are likely to grow. Here, since the magnetic characteristics on a whole circumference average is superior in the {100} orientation grains to the {110} orientation grains, it is more preferable to increase the number of the {100} orientation grains. What has been described above is also true for the relationship Sbc>Sbg in the highly distorted region.

Next, the relationship Sac>Sbc means that, in the {100} orientation grains, regions where there are a large number of distortions are relatively small. It is known that, in annealing after a skin pass, grains where there are a small number of distortions invade grains where there are a large number of distortions. Therefore, this inequality means that the {100} orientation grains are likely to grow. In addition, the KAM value is a value that is measured by the EBSD method, and the KAM value of a place where there are a large number of distortions becomes higher than those of peripheries thereof. What has been described above also applies to the relationship Sag>Sbg.

Next, the magnetic characteristics of the non-oriented electrical steel sheet according to the present embodiment will be described. At the time of investigating the magnetic characteristics, the magnetic flux density is measured after the non-oriented electrical steel sheet according to the present embodiment is further annealed under conditions of 800° C. and two hours. In the non-oriented electrical steel sheet according to the present embodiment, the magnetic characteristics are most favorable in two directions where, between angles formed by the rolling direction and each of the two directions, the small angle becomes 45°. On the other hand, in two directions where the angle formed by the rolling direction and each of the two directions is 0° or 90°, the magnetic characteristics are poorest. Here, the "45°" is a theoretical value, and, at the time of actual manufacturing, there is a case where it is not easy to match the angle to 45°.

Therefore, as long as the directions where the magnetic characteristics are most favorable are theoretically two directions where, between the angles formed by the rolling direction and each of the two directions, the small angle becomes 45°, in actual non-oriented electrical steel sheets, a direction where the 45° is not (strictly) matched to 45° is also regarded as the above-described direction. What has been described above also applies to the "0°" and "90°".

In addition, theoretically, the magnetic characteristics in the two directions where the magnetic characteristics are most favorable become the same as each other, but there is a case where it is not easy to make the magnetic characteristics in the two directions the same as each other at the time of actual manufacturing. Therefore, as long as the magnetic characteristics in the two directions where the magnetic characteristics are most favorable are theoretically the same as each other, the magnetic characteristics being not (strictly) the same as each other are also regarded as the above-described magnetic characteristics that are the same as each other. What has been described above also applies to the two directions where the magnetic characteristics are poorest. Regarding the above-described angles, both clockwise angles and counter-clockwise angles are expressed as positive values. In a case where the clockwise direction is expressed as a negative direction and the counter-clockwise direction is expressed as a positive direction, the two directions where, between the above-described angles formed by the rolling direction and each of the two directions, the small angle becomes 45° become two directions where, between the above-described angles formed by the rolling direction and each of the two directions, the angle with a small absolute value becomes 45° or −45°. In addition, the two directions where, between the above-described angles formed by the rolling direction and each of the two directions, the small angle becomes 450 can also be expressed as two directions where the angles formed by the rolling direction and each of the two directions become 45° and 135°.

When the magnetic flux density of the non-oriented electrical steel sheet according to the present embodiment is measured, the magnetic flux density B50 (corresponding to B50D1 and B50D2) in a 45° direction with respect to the rolling direction becomes 1.75 T or more. In the non-oriented electrical steel sheet according to the present embodiment, while the magnetic flux density in the 45° direction with respect to the rolling direction is high, high magnetic flux densities can also be obtained on a whole circumference average (all-direction average).

In the non-oriented electrical steel sheet according to the present embodiment, when the value of the magnetic flux density B50 in the rolling direction is indicated by B50L, the value of the magnetic flux density B50 in a direction at an angle of 45° from the rolling direction is indicated by B50D1, the value of the magnetic flux density B50 in a direction at an angle of 90° from the rolling direction is indicated by B50C, and the value of the magnetic flux density B50 in a direction at an angle of 135° from the rolling direction is indicated by B50D2, after the non-oriented electrical steel sheet is annealed at 800° C. for two hours, an anisotropy of the magnetic flux density where B50D1 and B50D2 are highest and B50L and B50C are lowest is shown.

Here, for example, in the case of considering an all-direction (0° to 360°) distribution of the magnetic flux densities for which the clockwise (which may be counter-clockwise) direction is regarded as a positive direction, when the rolling direction is set to 0° (one direction) and 180° (the other direction), B50D1 becomes the values of the magnetic flux density B50 at 45° and 225°, and B50D2 becomes the values of the magnetic flux density B50 at 135° and 315°. Similarly, B50L becomes the values of the magnetic flux density B50 at 0° and 180°, and B50C becomes the values of the magnetic flux density B50 at 90° and 270°. The value of the magnetic flux density B50 at 45° and the value of the magnetic flux density B50 at 225° strictly coincide with each other, and the value of the magnetic flux density B50 at 135° and the value of the magnetic flux density B50 at 315° strictly coincide with each other. However, since there is a case where it is not easy to make the magnetic characteristics the same as each other at the time of actual manufacturing, there is a case where B50D1's and B50D2's do not strictly coincide. Similarly, the value of the magnetic flux density B50 at 0° and the value of the magnetic flux density B50 at 180° strictly coincide with each other, and the value of the magnetic flux density B50 at 90° and the value of the magnetic flux density B50 at 270° strictly coincide with each other, but there is a case where B50L's and B50C's do not strictly coincide. In manufactured non-oriented electrical steel sheets, one rolling direction and the other rolling direction (the direction opposite to the above-described rolling direction) cannot be distinguished. Therefore, in the present embodiment, the rolling direction refers to both the one rolling direction and the other rolling direction.

In the non-oriented electrical steel sheet according to the present embodiment, Formula (2) below is more preferably satisfied using the average value of B50D1 and B50D2 and the average value of B50L and B50C.

$$(B50D1+B50D2)/2>(B50L+B50C)/2 \quad (2)$$

By having such a high anisotropy of the magnetic flux density, the non-oriented electrical steel sheet has an advantage of being suitable for split core-type motor materials.

In addition, by satisfying Formula (3) below, the non-oriented electrical steel sheet according to the present embodiment can be more preferably used as split core-type motor materials.

$$(B50D1+B50D2)/2>1.1\times(B50L+B50C)/2 \quad (3)$$

The magnetic flux density can be measured from 55 mm×55 mm samples cut out in directions at angles of 45°, 0° and the like with respect to the rolling direction using a single-sheet magnetic measuring instrument.

Next, an example of a method for manufacturing the non-oriented electrical steel sheet according to the present embodiment will be described. In the present embodiment, hot rolling, cold rolling, intermediate annealing, skin pass rolling and the like will be described.

First, the above-described steel material is heated and hot-rolled. The steel material is, for example, a slab that is manufactured by normal continuous casting. Rough rolling and finish rolling of the hot rolling are carried out at temperatures in the γ range (Ar1 temperature or higher). That is, the hot rolling is preferably carried out such that the temperature (finishing temperature) reaches the Ar1 temperature or higher when the steel material passes through the final pass of the finish rolling. In such a case, the steel material transforms from austenite to ferrite by subsequent cooling, whereby the crystal structure is refined. When subsequent cold rolling is carried out in a state where the crystal structure has been refined, bulging is likely to occur, and it is possible to facilitate growth of the {100} crystal grains, which are, normally, difficult to grow. The Ar1 temperature in the present embodiment is obtained from a thermal expansion change of the steel material (steel sheet) under cooling at an average cooling rate of 1° C./second. In addition, the Ac1 temperature in the present embodiment is obtained from a thermal expansion change of the steel material (steel sheet) under heating at an average heating rate of 1° C./second.

After that, the hot-rolled steel sheet is wound without being annealed. The temperature at the time of the winding is preferably higher than 250° C. and 600° C. or lower. When the hot-rolled steel sheet after the hot rolling is wound at higher than 250° C. and 600° C. or lower, it is possible to refine the crystal structure before cold rolling and to obtain an effect by which the {100} orientation where the magnetic characteristics are excellent at the time of bulging can be enriched. The temperature at the time of the winding is more preferably 400° C. to 500° C. and still more preferably 400° C. to 480° C.

After that, the hot-rolled steel sheet is pickled and cold-rolled. In the cold rolling, the rolling reduction is preferably set to 80% to 92%. As the rolling reduction increases, it becomes easier to grow the {100} crystal grains by subsequent bulging, but the winding of the hot-rolled steel sheet becomes more difficult, and operations are likely to become more difficult.

When the cold rolling ends, subsequently, intermediate annealing is carried out. In the present embodiment, the temperature in the intermediate annealing is controlled to be lower than the Ac1 temperature, whereby the recrystallization rate was set to 1% to 99%. When the temperature in the intermediate annealing is too low, since there is a case where recrystallization does not occur and bulging does not occur, there is a case where the {100} crystal grains do not sufficiently grow and the magnetic flux density does not increase. Therefore, the temperature in the intermediate annealing is preferably set to 600° C. or higher. In addition, when the temperature in the intermediate annealing is the Ac1 temperature or higher, the recrystallization rate of ferrite becomes close to 100%, but the presence ratio of recrystallized grains having crystal orientations other than the {100} crystal orientation that is needed to be developed from the viewpoint of the magnetic characteristics increases, and thus the magnetic flux density does not increase. The intermediate annealing causes the occurrence of bulging and facilitates the growth of the {100} crystal grains; however, in the present embodiment, it is possible to further grow the {100} crystal grains by, furthermore, making non-recrystallized grains and recrystallized grains present in a mixed form. In addition, the time of the intermediate annealing is preferably set to 5 to 60 seconds.

The recrystallization rate is 50% or more at a point in time after the intermediate annealing, which is preferable since it becomes easy for the {100} orientation grains to further grow after finishing annealing or stress relief annealing.

When the intermediate annealing ends, next, skin pass rolling is carried out. When rolling is carried out in a state where bulging has occurred as described above, the {100} crystal grains further grow from a portion where the bulging has occurred as a starting point. The rolling reduction of the skin pass rolling is preferably set to 5% to 25%, and, from the viewpoint of obtaining a high anisotropy of the magnetic flux density, the rolling reduction of the skin pass rolling is more preferably set to 5% to 15%.

In a case where the non-oriented electrical steel sheet is made to have the above-described distribution of distortions, when the rolling reduction (%) of the cold rolling is indicated by Rm, and the rolling reduction (%) at the time of the skin pass rolling is indicated by Rs, the rolling reductions of the cold rolling and the skin pass rolling are preferably adjusted such that 86<Rm+0.2×Rs<92 and 5<Rs<20 are satisfied.

In manufacturing steps of a product such as an actual motor core, forming or the like is carried out on the non-oriented electrical steel sheet to produce a desired steel member. In addition, in order to remove distortions or the like generated by forming or the like (for example, punching) carried out on the steel member made of the non-oriented electrical steel sheet, there is a case where stress relief annealing is carried out on the steel member. In a case where stress relief annealing is carried out on the non-oriented electrical steel sheet according to the present embodiment, it is preferable to set the temperature in the stress relief annealing to, for example, approximately 800° C. and to set the time of the stress relief annealing to approximately two hours.

The non-oriented electrical steel sheet according to the present embodiment can be manufactured as described above.

Steel members made of the non-oriented electrical steel sheet according to the present embodiment are applied to, for example, cores (motor cores) of rotary electric machines. In this case, individual flat sheet-like thin sheets are cut out from the non-oriented electrical steel sheet according to the present embodiment, and these flat sheet-like thin sheets are appropriately laminated, thereby producing an iron core that is used in a rotary electrical machine. Since the non-oriented electrical steel sheet having excellent magnetic characteristics is applied to this core, a rotary electrical machine in which the iron loss is suppressed at a low level and the torque is excellent is realized. Steel members made of the non-oriented electrical steel sheet according to the present embodiment can also be applied to products other than the cores of rotary electric machines, for example, cores for linear motors, static devices (reactors or transformers) or the like.

EXAMPLES

Next, the non-oriented electrical steel sheet according to an embodiment of the present invention will be specifically described while describing examples. The examples to be described below are simply examples of the method for manufacturing the non-oriented electrical steel sheet according to the embodiment of the present invention, and the non-oriented electrical steel sheet according to the present invention is not limited to the examples to be described below.

First Example

Molten steel was cast, thereby producing ingots having compositions shown in Table 1 below. After that, the produced ingots were hot-rolled by being heated up to 1150° C. and rolled such that the sheet thicknesses reached 2.5 mm. In addition, after the end of finish rolling, the hot-rolled steel sheets were cooled with water and wound. The temperature (finishing temperature) in a stage of the final pass of the finish rolling at this time was 830° C. and all temperatures were higher than the Ar1 temperature. In No. 108 where no γ-α transformation occurred, the finishing temperature was set to 850° C. In addition, the winding temperatures at the time of the winding were set to 500° C. Here, "left side of formula" in the table indicates the value of the left side of Formula (1) described above.

Next, the hot-rolled steel sheets were pickled to remove scales and cold-rolled until the sheet thicknesses reached 1.1 times the target sheet thickness (0.110 to 0.550 mm). In addition, intermediate annealing was carried out in a non-oxidizing atmosphere for 30 seconds, and the temperatures in the intermediate annealing were controlled to be within a range of 550° C. to 800° C. such that the recrystallization rates became as shown in Table 1, respectively. Next, a second round of the cold rolling (skin pass rolling) was carried out until the sheet thicknesses reached the target sheet thickness (0.10 to 0.50 mm). Here, for No. 117, the hot-rolled steel sheet was cold-rolled to a thickness of 0.360 mm, and, after the intermediate annealing, the second round of the cold rolling was carried out until the sheet thickness reached 0.35 mm.

Next, stress relief annealing was carried out at 800° C. for two hours after the second round of the cold rolling (skin pass rolling) in order to investigate the magnetic characteristics, and the magnetic flux density B50 was measured. As measurement samples, 55 mm×55 mm samples were collected in two directions at an angle of 0° C. or 45° C. with respect to a rolling direction. In addition, the magnetic flux densities B50 of these two types of samples were measured, the value of the magnetic flux density B50 in a direction at an angle of 45° with respect to the rolling direction was regarded as B50D1, the value of the magnetic flux density B50 in a direction at an angle of 135° with respect to the rolling direction was regarded as B50D2, the value of the magnetic flux density B50 in the rolling direction was regarded as B50L, and the value of the magnetic flux density B50 in a direction at an angle of 90° with respect to the rolling direction was regarded as B50C. In addition, the average value of B50D1, B50D2, B50L and B50C was regarded as the whole circumference average of the magnetic flux density B50. These conditions and measurement results are shown in Table 1 and Table 2.

TABLE 1

| | Composition (mass %) | | | | | | | | | | | | | Characteristics of steel sheet | | | |
|---|---|---|---|---|---|---|---|---|---|---|---|---|---|---|---|---|---|
| No. | C | Si | sol-Al | S | N | Mn | Ni | Co | Pt | Pb | Cu | Au | Left side of formula | Recrystal-lization rate | Sheet thick-ness (mm) | Note |
| 101 | 0.0014 | 2.51 | 0.0071 | 0.0017 | 0.0022 | 3.06 | — | — | — | — | — | — | 0.54 | 85% | 0.35 | Invention Example |
| 102 | 0.0007 | 2.50 | 0.0109 | 0.0019 | 0.0023 | — | 3.08 | — | — | — | — | — | 0.57 | 85% | 0.35 | Invention Example |
| 103 | 0.0008 | 2.47 | 0.0100 | 0.0023 | 0.0020 | — | — | 3.06 | — | — | — | — | 0.58 | 85% | 0.35 | Invention Example |

TABLE 1-continued

| | Composition (mass %) | | | | | | | | | | | | | Characteristics of steel sheet | | | |
|---|---|---|---|---|---|---|---|---|---|---|---|---|---|---|---|---|---|
| No. | C | Si | sol-Al | S | N | Mn | Ni | Co | Pt | Pb | Cu | Au | Left side of formula | Recrystal-lization rate | Sheet thick-ness (mm) | Note |
| 104 | 0.0007 | 2.49 | 0.0115 | 0.0019 | 0.0022 | — | — | — | 3.09 | — | — | — | 0.60 | 85% | 0.35 | Invention Example |
| 105 | 0.0009 | 2.50 | 0.0129 | 0.0024 | 0.0021 | — | — | — | — | 3.07 | — | — | 0.56 | 85% | 0.35 | Invention Example |
| 106 | 0.0013 | 2.46 | 0.0135 | 0.0022 | 0.0016 | — | — | — | — | — | 3.07 | — | 0.59 | 85% | 0.35 | Invention Example |
| 107 | 0.0006 | 2.48 | 0.0067 | 0.0017 | 0.0021 | — | — | — | — | — | — | 3.14 | 0.65 | 85% | 0.35 | Invention Example |
| 108 | 0.0011 | 3.20 | 0.0064 | 0.0024 | 0.0019 | 3.14 | — | — | — | — | — | — | −0.07 | 85% | 0.35 | Comparative Example |
| 109 | 0.0007 | 2.48 | 0.2981 | 0.0024 | 0.0019 | 3.43 | — | — | — | — | — | — | 0.65 | 85% | 0.35 | Invention Example |
| 110 | 0.0009 | 2.47 | 0.0089 | 0.0016 | 0.0023 | 3.11 | — | — | — | — | — | — | 0.64 | 55% | 0.35 | Invention Example |
| 111 | 0.0007 | 2.48 | 0.0079 | 0.0017 | 0.0019 | 3.12 | — | — | — | — | — | — | 0.64 | 30% | 0.35 | Invention Example |
| 112 | 0.0012 | 2.49 | 0.0061 | 0.0018 | 0.0023 | 3.13 | — | — | — | — | — | — | 0.63 | 0% | 0.35 | Comparative Example |
| 113 | 0.0007 | 2.49 | 0.0125 | 0.0024 | 0.0020 | 3.11 | — | — | — | — | — | — | 0.61 | 100% | 0.35 | Comparative Example |
| 114 | 0.0009 | 2.54 | 0.0112 | 0.0017 | 0.0020 | 3.06 | — | — | — | — | — | — | 0.51 | 85% | 0.50 | Invention Example |
| 115 | 0.0011 | 2.47 | 0.0089 | 0.0017 | 0.0018 | 3.13 | — | — | — | — | — | — | 0.65 | 85% | 0.25 | Invention Example |
| 116 | 0.0012 | 2.51 | 0.0074 | 0.0019 | 0.0023 | 3.08 | — | — | — | — | — | — | 0.56 | 85% | 0.10 | Invention Example |
| 117 | 0.0011 | 2.48 | 0.0105 | 0.0020 | 0.0019 | 3.11 | — | — | — | — | — | — | 0.61 | 85% | 0.35 | Invention Example |
| 118 | 0.0008 | 2.50 | 0.5989 | 0.0021 | 0.0020 | 3.68 | — | — | — | — | — | — | 0.58 | 85% | 0.35 | Invention Example |
| 119 | 0.0009 | 2.51 | 0.8985 | 0.0019 | 0.0021 | 4.00 | — | — | — | — | — | — | 0.59 | 85% | 0.35 | Invention Example |

TABLE 2

| | B50 after annealing at 800° C. for two hours (T) | | | | | | |
|---|---|---|---|---|---|---|---|
| No. | Whole circumference average B50 | B50D1 (T) | B50D2 (T) | B50L (T) | B50C (T) | Formula (2) | Formula (3) | Note |
| 101 | 1.681 | 1.809 | 1.808 | 1.558 | 1.549 | O | O | Invention Example |
| 102 | 1.676 | 1.806 | 1.812 | 1.555 | 1.532 | O | O | Invention Example |
| 103 | 1.677 | 1.808 | 1.809 | 1.557 | 1.533 | O | O | Invention Example |
| 104 | 1.678 | 1.807 | 1.810 | 1.557 | 1.537 | O | O | Invention Example |
| 105 | 1.682 | 1.812 | 1.812 | 1.554 | 1.549 | O | O | Invention Example |
| 106 | 1.682 | 1.813 | 1.811 | 1.557 | 1.545 | O | O | Invention Example |
| 107 | 1.678 | 1.812 | 1.811 | 1.555 | 1.534 | O | O | Invention Example |
| 108 | 1.614 | 1.551 | 1.559 | 1.688 | 1.658 | X | X | Comparative Example |
| 109 | 1.670 | 1.787 | 1.786 | 1.562 | 1.543 | O | O | Invention Example |
| 110 | 1.673 | 1.783 | 1.785 | 1.561 | 1.562 | O | O | Invention Example |
| 111 | 1.658 | 1.754 | 1.757 | 1.562 | 1.558 | O | O | Invention Example |
| 112 | 1.612 | 1.553 | 1.559 | 1.689 | 1.646 | X | X | Comparative Example |

TABLE 2-continued

| | B50 after annealing at 800° C. for two hours (T) | | | | | | |
|---|---|---|---|---|---|---|---|
| No. | Whole circumference average B50 | B50D1 (T) | B50D2 (T) | B50L (T) | B50C (T) | Formula (2) | Formula (3) | Note |
| 113 | 1.618 | 1.559 | 1.563 | 1.689 | 1.659 | X | X | Comparative Example |
| 114 | 1.682 | 1.809 | 1.810 | 1.553 | 1.554 | O | O | Invention Example |
| 115 | 1.679 | 1.810 | 1.811 | 1.553 | 1.542 | O | O | Invention Example |
| 116 | 1.648 | 1.769 | 1.771 | 1.528 | 1.526 | O | O | Invention Example |
| 117 | 1.682 | 1.762 | 1.758 | 1.579 | 1.628 | O | X | Invention Example |
| 118 | 1.658 | 1.779 | 1.779 | 1.548 | 1.526 | O | O | Invention Example |
| 119 | 1.650 | 1.769 | 1.770 | 1.540 | 1.520 | O | O | Invention Example |

Underlined values in Table 1 and Table 2 indicate conditions deviating from the scope of the present invention. In all of No. 101 to No. 107, No. 109 to No. 111 and No. 114 to No. 119, which were invention examples, the magnetic flux densities B50 were favorable values both in the 45° direction and on the whole circumference average. On the other hand, in No. 108, which was a comparative example, since the Si concentration was high, the value of the left side of the formula was 0 or less, and the composition did not undergo α-γ transformation, the magnetic flux densities B50 were all low. In No. 112, which was a comparative example, since the temperature in the intermediate annealing was low compared with those in other examples, the recrystallization rate was 0, and thus the magnetic flux densities B50 were all low. In No. 113, which was a comparative example, since the recrystallization rate was 100, which deviates from the scope of the present invention, the magnetic flux densities B50 were all low. In No. 117, the magnetic characteristics were favorable, but the rolling reduction in the skin pass rolling was changed, and thus Formula (3) was not satisfied.

Second Example

Molten steel was cast, thereby producing ingots having compositions shown in Table 3 below. After that, the produced ingots were hot-rolled by being heated up to 1150° C. and rolled such that the sheet thicknesses reached 2.5 mm. In addition, after the end of finish rolling, the hot-rolled steel sheets were cooled with water and wound. The finishing temperature in a stage of the final pass of the finish rolling at this time was 830° C. and all temperatures were higher than the Ar1 temperature. In addition, the winding temperatures at the time of the winding were set to 500° C.

Next, the hot-rolled steel sheets were pickled to remove scales and cold-rolled in a rolling reduction of 85% until the sheet thicknesses reached 0.385 mm. In addition, intermediate annealing was carried out in a non-oxidizing atmosphere for 30 seconds, and the temperatures in the intermediate annealing were controlled such that the recrystallization rates became 85%. Next, a second round of the cold rolling (skin pass rolling) was carried out in a rolling reduction of 9% until the sheet thicknesses reached 0.35 mm. Here, for No. 215, the hot-rolled steel sheet was cold-rolled to a thickness of 0.360 mm, and, after the intermediate annealing, the second round of the cold rolling was carried out until the sheet thickness reached 0.35 mm.

Next, stress relief annealing was carried out at 800° C. for two hours after the second round of the cold rolling (skin pass rolling) in order to investigate the magnetic characteristics, and, similar to the first example, the magnetic flux density B50 in each direction and an iron loss W10/400 were measured. The magnetic flux density B50 was measured in the same order as in the first example. On the other hand, the iron loss W10/400 was measured as an energy loss (W/kg) on a whole circumference average that was caused in a sample when an alternating-current magnetic field of 400 Hz was applied such that the maximum magnetic flux density reached 1.0 T. These conditions and results are shown in Table 3 and Table 4.

TABLE 3

| | Composition (mass %) | | | | | | | | | |
|---|---|---|---|---|---|---|---|---|---|---|
| No. | C | Si | sol-Al | S | N | Mn | Sn | Sb | P | Mg |
| 201 | 0.0011 | 2.47 | 0.0127 | 0.0019 | 0.0019 | 3.08 | — | — | — | — |
| 202 | 0.0010 | 2.46 | 0.0111 | 0.0016 | 0.0022 | 3.10 | 0.051 | — | — | — |
| 203 | 0.0011 | 2.46 | 0.0103 | 0.0022 | 0.0020 | 3.09 | — | 0.050 | — | — |
| 204 | 0.0007 | 2.50 | 0.0111 | 0.0020 | 0.0019 | 3.08 | — | — | 0.049 | — |
| 205 | 0.0008 | 2.50 | 0.0068 | 0.0018 | 0.0019 | 3.13 | — | — | — | 0.0047 |
| 206 | 0.0014 | 2.48 | 0.0082 | 0.0024 | 0.0021 | 3.07 | — | — | — | — |
| 207 | 0.0007 | 2.50 | 0.0097 | 0.0023 | 0.0018 | 3.10 | — | — | — | — |
| 208 | 0.0009 | 2.48 | 0.0075 | 0.0023 | 0.0018 | 3.10 | — | — | — | — |
| 209 | 0.0009 | 2.53 | 0.0118 | 0.0017 | 0.0022 | 3.07 | — | — | — | — |
| 210 | 0.0010 | 2.52 | 0.0122 | 0.0024 | 0.0018 | 3.10 | — | — | — | — |
| 211 | 0.0008 | 2.47 | 0.0114 | 0.0023 | 0.0018 | 3.13 | — | — | — | — |

TABLE 3-continued

| | | | | | | | | | |
|---|---|---|---|---|---|---|---|---|---|
| 212 | 0.0008 | 2.52 | 0.0074 | 0.0016 | 0.0017 | 3.07 | — | — | — | — |
| 213 | 0.0010 | 2.48 | 0.0106 | 0.0016 | 0.0024 | 3.13 | — | — | — | — |
| 214 | 0.0006 | 2.54 | 0.0114 | 0.0019 | 0.0019 | 3.13 | — | — | — | — |
| 215 | 0.0010 | 2.48 | 0.0092 | 0.0020 | 0.0020 | 3.09 | 0.050 | — | — | — |
| 216 | 0.0008 | 2.51 | 0.6016 | 0.0018 | 0.0021 | 3.72 | 0.048 | — | — | — |
| 217 | 0.0009 | 2.48 | 0.9012 | 0.0020 | 0.0021 | 4.01 | 0.048 | — | — | — |

| | Composition (mass %) | | | | | | | | Left side of formula |
|---|---|---|---|---|---|---|---|---|---|
| No. | Ca | Sr | Ba | Ce | La | Nd | Pr | Zn | Cd | |
| 201 | — | — | — | — | — | — | — | — | — | 0.59 |
| 202 | — | — | — | — | — | — | — | — | — | 0.63 |
| 203 | — | — | — | — | — | — | — | — | — | 0.62 |
| 204 | — | — | — | — | — | — | — | — | — | 0.57 |
| 205 | — | — | — | — | — | — | — | — | — | 0.62 |
| 206 | 0.0051 | — | — | — | — | — | — | — | — | 0.58 |
| 207 | — | 0.0051 | — | — | — | — | — | — | — | 0.59 |
| 208 | — | — | 0.0053 | — | — | — | — | — | — | 0.61 |
| 209 | — | — | — | 0.0053 | — | — | — | — | — | 0.53 |
| 210 | — | — | — | — | 0.0046 | — | — | — | — | 0.57 |
| 211 | — | — | — | — | — | 0.0048 | — | — | — | 0.65 |
| 212 | — | — | — | — | — | — | 0.0051 | — | — | 0.55 |
| 213 | — | — | — | — | — | — | — | 0.0048 | — | 0.63 |
| 214 | — | — | — | — | — | — | — | — | 0.0049 | 0.59 |
| 215 | — | — | — | — | — | — | — | — | — | 0.60 |
| 216 | — | — | — | — | — | — | — | — | — | 0.61 |
| 217 | — | — | — | — | — | — | — | — | — | 0.62 |

TABLE 4

| | Characteristics of steel sheet | | Whole circumference average B50 (T) | W10/400 (W/kg) | B50 after annealing at 800° C. for two hours (T) | | | | Formula (2) | Formula (3) | Note |
|---|---|---|---|---|---|---|---|---|---|---|---|
| No. | Recrystal-lization rate | Sheet thickness (mm) | | | B50D1 (T) | B50D2 (T) | B50L (T) | B50C (T) | | | |
| 201 | 85% | 0.35 | 1.678 | 15.33 | 1.810 | 1.810 | 1.551 | 1.539 | O | O | Invention Example |
| 202 | 85% | 0.35 | 1.703 | 15.34 | 1.823 | 1.819 | 1.560 | 1.608 | O | O | Invention Example |
| 203 | 85% | 0.35 | 1.702 | 15.27 | 1.818 | 1.820 | 1.561 | 1.609 | O | O | Invention Example |
| 204 | 85% | 0.35 | 1.700 | 15.32 | 1.819 | 1.821 | 1.559 | 1.602 | O | O | Invention Example |
| 205 | 85% | 0.35 | 1.683 | 14.90 | 1.809 | 1.811 | 1.548 | 1.566 | O | O | Invention Example |
| 206 | 85% | 0.35 | 1.681 | 14.94 | 1.807 | 1.812 | 1.550 | 1.556 | O | O | Invention Example |
| 207 | 85% | 0.35 | 1.683 | 14.89 | 1.812 | 1.810 | 1.552 | 1.560 | O | O | Invention Example |
| 208 | 85% | 0.35 | 1.683 | 14.87 | 1.809 | 1.811 | 1.550 | 1.563 | O | O | Invention Example |
| 209 | 85% | 0.35 | 1.681 | 14.86 | 1.807 | 1.810 | 1.551 | 1.558 | O | O | Invention Example |
| 210 | 85% | 0.35 | 1.679 | 14.90 | 1.810 | 1.809 | 1.550 | 1.547 | O | O | Invention Example |
| 211 | 85% | 0.35 | 1.679 | 14.89 | 1.812 | 1.809 | 1.550 | 1.545 | O | O | Invention Example |
| 212 | 85% | 0.35 | 1.681 | 14.92 | 1.811 | 1.810 | 1.549 | 1.553 | O | O | Invention Example |
| 213 | 85% | 0.35 | 1.681 | 14.93 | 1.810 | 1.811 | 1.548 | 1.555 | O | O | Invention Example |
| 214 | 85% | 0.35 | 1.679 | 14.90 | 1.810 | 1.811 | 1.548 | 1.546 | O | O | Invention Example |
| 215 | 85% | 0.35 | 1.689 | 15.32 | 1.760 | 1.761 | 1.633 | 1.603 | O | X | Invention Example |
| 216 | 85% | 0.35 | 1.650 | 14.32 | 1.771 | 1.770 | 1.539 | 1.520 | O | O | Invention Example |
| 217 | 85% | 0.35 | 1.640 | 13.81 | 1.761 | 1.762 | 1.531 | 1.505 | O | O | Invention Example |

No. 201 to No. 217 were all invention examples and all had favorable magnetic characteristics. It is considered that these results were obtained by adjusting the compositions of the non-oriented electrical steel sheets. In No. 215, the magnetic characteristics were favorable, but the rolling reduction in the skin pass rolling was changed, and thus Formula (3) was not satisfied.

Third Example

Molten steel was cast, thereby producing ingots having compositions shown in Table 5 below. After that, the produced ingots were hot-rolled by being heated up to 1150° C. and rolled such that the sheet thicknesses reached 2.5 mm. In addition, after the end of finish rolling, the hot-rolled steel sheets were cooled with water and wound. The finishing temperature in a stage of the final pass of the finish rolling at this time was 830° C. and all temperatures were higher than the Ar1 temperature. In addition, the hot-rolled steel sheets were wound at winding temperatures shown in Table 6, respectively.

Next, the hot-rolled steel sheets were pickled to remove scales and cold-rolled in a rolling reduction of 85% until the sheet thicknesses reached 0.385 mm. In addition, intermediate annealing was carried out in a non-oxidizing atmosphere for 30 seconds, and the temperatures in the intermediate annealing were controlled such that the recrystallization rates became 85%. Next, a second round of the cold rolling (skin pass rolling) was carried out in a rolling reduction of 9% until the sheet thicknesses reached 0.35 mm.

Next, stress relief annealing was carried out at 800° C. for two hours after the second round of the cold rolling (skin pass rolling) in order to investigate the magnetic characteristics, and the magnetic flux density B50 and the iron loss W10/400 were measured. The magnetic flux density B50 in each direction was measured in the same order as in the first example. On the other hand, the iron loss W10/400 was measured as an energy loss (W/kg) on a whole circumference average that was caused in a sample when an alternating-current magnetic field of 400 Hz was applied such that the maximum magnetic flux density reached 1.0 T. These conditions and results are shown in Table 5 and Table 6.

TABLE 5

| Composition | Composition (mass %) | | | | | | Left side of formula |
|---|---|---|---|---|---|---|---|
| | C | Si | sol-Al | S | N | Mn | |
| A | 0.0011 | 2.49 | 0.0098 | 0.0020 | 0.0018 | 3.11 | 0.61 |
| B | 0.0011 | 2.50 | 0.3012 | 0.0022 | 0.0019 | 3.40 | 0.60 |
| C | 0.0011 | 2.49 | 0.4487 | 0.0020 | 0.0018 | 3.55 | 0.61 |
| D | 0.0010 | 2.51 | 0.6014 | 0.0021 | 0.0019 | 3.70 | 0.59 |
| E | 0.0011 | 2.50 | 0.7501 | 0.0019 | 0.0021 | 3.86 | 0.61 |

TABLE 6

| No. | Composition | Characteristics of steel sheet | | Coiling temperature (° C.) | B50 after annealing at 800° C. for two hours (T) | | | | | | | Note |
|---|---|---|---|---|---|---|---|---|---|---|---|---|
| | | Recrystallization rate | Sheet thickness (mm) | | Whole circumference average B50 (T) | W10/400 (W/kg) | B50D1 (T) | B50D2 (T) | B50L (T) | B50C (T) | Formula (2) | Formula (3) | |
| 301 | A | 85% | 0.35 | 500 | 1.674 | 15.34 | 1.795 | 1.795 | 1.560 | 1.546 | O | O | Invention Example |
| 302 | A | 85% | 0.35 | 600 | 1.677 | 15.26 | 1.784 | 1.784 | 1.561 | 1.579 | O | O | Invention Example |
| 303 | A | 85% | 0.35 | 700 | 1.649 | 15.83 | 1.719 | 1.721 | 1.576 | 1.580 | O | X | Comparative Example |
| 304 | A | 85% | 0.35 | 400 | 1.671 | 15.27 | 1.788 | 1.789 | 1.561 | 1.547 | O | O | Invention Example |
| 305 | A | 85% | 0.35 | 300 | 1.668 | 15.39 | 1.786 | 1.788 | 1.558 | 1.542 | O | O | Invention Example |
| 306 | A | 85% | 0.35 | 200 | 1.651 | 15.81 | 1.749 | 1.749 | 1.540 | 1.565 | O | O | Comparative Example |
| 307 | B | 85% | 0.35 | 500 | 1.671 | 15.09 | 1.789 | 1.787 | 1.556 | 1.553 | O | O | Invention Example |
| 308 | B | 85% | 0.35 | 600 | 1.671 | 14.99 | 1.782 | 1.781 | 1.555 | 1.567 | O | O | Invention Example |
| 309 | B | 85% | 0.35 | 700 | 1.646 | 15.54 | 1.715 | 1.714 | 1.574 | 1.581 | O | X | Comparative Example |
| 310 | B | 85% | 0.35 | 400 | 1.665 | 15.08 | 1.785 | 1.785 | 1.554 | 1.537 | O | O | Invention Example |
| 311 | B | 85% | 0.35 | 300 | 1.663 | 15.10 | 1.782 | 1.779 | 1.556 | 1.536 | O | O | Invention Example |
| 312 | B | 85% | 0.35 | 200 | 1.647 | 15.60 | 1.746 | 1.744 | 1.535 | 1.563 | O | O | Comparative Example |
| 313 | C | 85% | 0.35 | 500 | 1.666 | 14.81 | 1.783 | 1.786 | 1.551 | 1.542 | O | O | Invention Example |
| 314 | C | 85% | 0.35 | 600 | 1.666 | 14.75 | 1.776 | 1.776 | 1.551 | 1.559 | O | O | Invention Example |
| 315 | C | 85% | 0.35 | 700 | 1.642 | 15.30 | 1.710 | 1.710 | 1.580 | 1.567 | O | X | Comparative Example |
| 316 | C | 85% | 0.35 | 400 | 1.660 | 14.79 | 1.779 | 1.781 | 1.549 | 1.533 | O | O | Invention Example |
| 317 | C | 85% | 0.35 | 300 | 1.657 | 14.89 | 1.776 | 1.776 | 1.550 | 1.525 | O | O | Invention Example |
| 318 | C | 85% | 0.35 | 200 | 1.640 | 15.31 | 1.740 | 1.740 | 1.531 | 1.551 | O | O | Comparative Example |
| 319 | D | 85% | 0.35 | 500 | 1.660 | 14.28 | 1.779 | 1.782 | 1.546 | 1.533 | O | O | Invention Example |
| 320 | D | 85% | 0.35 | 700 | 1.628 | 14.77 | 1.705 | 1.705 | 1.550 | 1.554 | O | X | Comparative Example |
| 321 | D | 85% | 0.35 | 200 | 1.630 | 14.82 | 1.733 | 1.736 | 1.519 | 1.533 | O | O | Comparative Example |
| 322 | E | 85% | 0.35 | 500 | 1.654 | 13.86 | 1.775 | 1.774 | 1.540 | 1.527 | O | O | Invention Example |
| 323 | E | 85% | 0.35 | 700 | 1.627 | 14.64 | 1.702 | 1.702 | 1.560 | 1.544 | O | X | Comparative Example |
| 324 | E | 85% | 0.35 | 200 | 1.619 | 14.63 | 1.726 | 1.728 | 1.511 | 1.509 | O | O | Comparative Example |

Underlined values in Table 6 indicate conditions deviating from the scope of the present invention. In all of No. 301, No. 302, No. 304, No. 305, No. 307, No. 308, No. 310, No. 311, No. 313, No. 314, No. 316, No. 317, No. 319 and No. 322, which were invention examples, the magnetic flux densities B50 were favorable values both in the 45° direction and on the whole circumference average. On the other hand, in No. 303, No. 306, No. 309, No. 312, No. 315, No. 318, No. 320, No. 321, No. 323 and No. 324, which were comparative examples, since the winding temperatures deviated from the optimal range, the magnetic flux densities B50 were all low and less than 1.75 T.

As is understood from the above-described examples, the non-oriented electrical steel sheet according to the present invention has excellent magnetic characteristics on a whole circumference average (all-direction average) since the chemical composition, the hot rolling conditions, the cold rolling conditions, the annealing conditions and the recrystallization rate are appropriately controlled.

INDUSTRIAL APPLICABILITY

According to the present invention, it is possible to provide a non-oriented electrical steel sheet in which excellent magnetic characteristics can be obtained on a whole circumference average (all-direction average), and thus the present invention is extremely industrially available.

What is claimed is:

1. A non-oriented electrical steel sheet comprising a chemical composition in which, by mass %:
   C: 0.010% or less,
   Si: 1.50% to 4.00%,
   sol. Al: 0.0001% to 1.0%,
   S: 0.010% or less,
   N: 0.010% or less,
   one or a plurality of elements selected from the group of Mn, Ni, Co, Pt, Pb, Cu and Au: 2.50% to 5.00% in total,
   Sn: 0.000% to 0.400%,
   Sb: 0.000% to 0.400%,
   P: 0.000% to 0.400%, and
   one or a plurality of elements selected from the group of Mg, Ca, Sr, Ba, Ce, La, Nd, Pr, Zn and Cd: 0.0000% to 0.0100% in total are contained,
   when a Mn content (mass %) is indicated by [Mn], a Ni content (mass %) is indicated by [Ni], a Co content (mass %) is indicated by [Co], a Pt content (mass %) is indicated by [Pt], a Pb content (mass %) is indicated by [Pb], a Cu content (mass %) is indicated by [Cu], a Au content (mass %) is indicated by [Au], a Si content (mass %) is indicated by [Si], and a sol. Al content (mass %) is indicated by [sol. Al], Formula (1) below is satisfied, and
   a remainder includes Fe and impurities,
   wherein a recrystallization rate is 1% to 99% in a metallographic structure, a sheet thickness is 0.50 mm or less, and,
   in the case of measuring a magnetic flux density B50 after annealing the non-oriented electrical steel sheet at 800° C. for two hours, a magnetic flux density B50 in a 45° direction with respect to a rolling direction is 1.75 T or more, $$([Mn]+[Ni]+[Co]+[Pt]+[Pb]+[Cu]+[Au])-([Si]+[sol.\ Al])>0\%  \qquad (1).$$

2. The non-oriented electrical steel sheet according to claim 1,
   wherein, when a value of a magnetic flux density B50 in a rolling direction is indicated by B50L, a value of a magnetic flux density B50 in a direction at an angle of 45° from the rolling direction is indicated by B50D1, a value of a magnetic flux density B50 in a direction at an angle of 90° from the rolling direction is indicated by B50C, and a value of a magnetic flux density B50 in a direction at an angle of 135° from the rolling direction is indicated by B50D2, after the non-oriented electrical steel sheet is annealed at 800° C. for two hours, Formula (2) below is satisfied, $$(B50D1+B50D2)/2>(B50L+B50C)/2 \qquad (2).$$

3. The non-oriented electrical steel sheet according to claim 2,
   wherein Formula (3) below is satisfied, $$(B50D1+B50D2)/2>1.1\times(B50L+B50C)/2 \qquad (3).$$

4. The non-oriented electrical steel sheet according to claim 3, further comprising, by mass %, one or a plurality of elements selected from the group of:
   Sn: 0.020% to 0.400%,
   Sb: 0.020% to 0.400%, and
   P: 0.020% to 0.400%.

5. The non-oriented electrical steel sheet according to claim 4, further comprising, by mass %, one or a plurality of elements selected from the group of:
   Mg, Ca, Sr, Ba, Ce, La, Nd, Pr, Zn and Cd: 0.0005% to 0.0100% in total.

6. The non-oriented electrical steel sheet according to claim 4,
   wherein, in the metallographic structure, the recrystallization rate is 50% to 99%.

7. The non-oriented electrical steel sheet according to claim 3, further comprising, by mass %, one or a plurality of elements selected from the group of:
   Mg, Ca, Sr, Ba, Ce, La, Nd, Pr, Zn and Cd: 0.0005% to 0.0100% in total.

8. The non-oriented electrical steel sheet according to claim 3,
   wherein, in the metallographic structure, the recrystallization rate is 50% to 99%.

9. The non-oriented electrical steel sheet according to claim 2, further comprising, by mass %, one or a plurality of elements selected from the group of:
   Sn: 0.020% to 0.400%,
   Sb: 0.020% to 0.400%, and
   P: 0.020% to 0.400%.

10. The non-oriented electrical steel sheet according to claim 9, further comprising, by mass %, one or a plurality of elements selected from the group of:
    Mg, Ca, Sr, Ba, Ce, La, Nd, Pr, Zn and Cd: 0.0005% to 0.0100% in total.

11. The non-oriented electrical steel sheet according to claim 9,
    wherein, in the metallographic structure, the recrystallization rate is 50% to 99%.

12. The non-oriented electrical steel sheet according to claim 2, further comprising, by mass %, one or a plurality of elements selected from the group of:
    Mg, Ca, Sr, Ba, Ce, La, Nd, Pr, Zn and Cd: 0.0005% to 0.0100% in total.

13. The non-oriented electrical steel sheet according to claim 2,
wherein, in the metallographic structure, the recrystallization rate is 50% to 99%.

14. The non-oriented electrical steel sheet according to claim 1, further comprising, by mass %, one or a plurality of elements selected from the group of:
Sn: 0.020% to 0.400%,
Sb: 0.020% to 0.400%, and
P: 0.020% to 0.400%.

15. The non-oriented electrical steel sheet according to claim 14, further comprising, by mass %, one or a plurality of elements selected from the group of:
Mg, Ca, Sr, Ba, Ce, La, Nd, Pr, Zn and Cd: 0.0005% to 0.0100% in total.

16. The non-oriented electrical steel sheet according to claim 14,
wherein, in the metallographic structure, the recrystallization rate is 50% to 99%.

17. The non-oriented electrical steel sheet according to claim 1, further comprising, by mass %, one or a plurality of elements selected from the group of:
Mg, Ca, Sr, Ba, Ce, La, Nd, Pr, Zn and Cd: 0.0005% to 0.0100% in total.

18. The non-oriented electrical steel sheet according to claim 17,
wherein, in the metallographic structure, the recrystallization rate is 50% to 99%.

19. The non-oriented electrical steel sheet according to claim 1,
wherein, in the metallographic structure, the recrystallization rate is 50% to 99%.

20. The non-oriented electrical steel sheet according to claim 1,
wherein, in the metallographic structure, the recrystallization rate is 80% to 99%.

* * * * *